(12) United States Patent
Hu et al.

(10) Patent No.: US 8,815,346 B2
(45) Date of Patent: Aug. 26, 2014

(54) COMPLIANT AND NONPLANAR NANOSTRUCTURE FILMS

(75) Inventors: Liangbing Hu, Palo Alto, CA (US); David Hecht, San Carlos, CA (US); Jeffrey Jue, Belmont, CA (US); George Gruner, Los Angeles, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1029 days.

(21) Appl. No.: 11/872,360

(22) Filed: Oct. 15, 2007

(65) Prior Publication Data
US 2008/0317982 A1 Dec. 25, 2008

Related U.S. Application Data

(60) Provisional application No. 60/829,470, filed on Oct. 13, 2006, provisional application No. 60/865,826, filed on Nov. 14, 2006.

(51) Int. Cl.
*B05D 5/12* (2006.01)

(52) U.S. Cl.
USPC ............................. 427/372.2; 977/742

(58) Field of Classification Search
USPC .................. 428/36.9, 34.1, 35.7, 36.91, 98; 977/742; 427/372.2
See application file for complete search history.

(56) References Cited

U.S. PATENT DOCUMENTS

| | | | | |
|---|---|---|---|---|
| 4,310,973 A | * | 1/1982 | King | 34/368 |
| 6,139,919 A | * | 10/2000 | Eklund et al. | 427/430.1 |
| 6,355,358 B1 | * | 3/2002 | Boer et al. | 428/474.4 |
| 2002/0054995 A1 | * | 5/2002 | Mazurkiewicz | 428/364 |
| 2002/0069826 A1 | * | 6/2002 | Hunt et al. | 118/718 |
| 2006/0058443 A1 | * | 3/2006 | Ohashi et al. | 524/496 |
| 2006/0121185 A1 | * | 6/2006 | Xu et al. | 427/163.1 |
| 2006/0188721 A1 | * | 8/2006 | Irvin et al. | 428/402 |

* cited by examiner

*Primary Examiner* — Erik Kashnikow

(74) *Attorney, Agent, or Firm* — Harness, Dickey & Pierce, P.L.C.

(57) ABSTRACT

A coated substrate comprising a nanostructure film formed on a non-planar substrate is described. The coated substrate may further be compliant, optically transparent and/or electrically conductive. Fabrication methods thereof are also described.

17 Claims, 8 Drawing Sheets

COMPLIANT AND NONPLANAR NANOSTRUCTURE FILMS

This application claims priority to U.S. Provisional Patent Application Nos. 60/829,470, filed Oct. 13, 2006 and entitled "FLASH-DRY DEPOSITION OF NANOSTRUCTURE FILMS," and 60/865,826, filed Nov. 14, 2006 and entitled "TRANSFER STAMPING OF NANOSTRUCTURE FILMS."

FIELD OF THE INVENTION

The present invention relates generally to nanostructure films and/or deposition methods thereof, and more specifically to non-planar and compliant nanostructure films and/or deposition methods thereof.

BACKGROUND OF THE INVENTION

Many modern and/or emerging applications require at least one device electrode that has not only high electrical conductivity, but high optical transparency as well. Such applications include, but are not limited to, touch screens (e.g., analog, resistive, 4-wire resistive, 5-wire resistive, surface capacitive, projected capacitive, multi-touch, etc.), displays (e.g., flexible, rigid, electro-phoretic, electro-luminescent, electro-chromatic, liquid crystal (LCD), plasma (PDP), organic light emitting diode (OLED), etc.), solar cells (e.g., silicon (amorphous, protocrystalline, nanocrystalline), cadmium telluride (CdTe), copper indium gallium selenide (CIGS), copper indium selenide (CIS), gallium arsenide (GaAs), light absorbing dyes, quantum dots, organic semiconductors (e.g., polymers, small-molecule compounds), solid state lighting, fiber-optic communications (e.g., electro-optic and opto-electric modulators) and microfluidics (e.g., electrowetting on dielectric (EWOD).

As used herein, a layer of material or a sequence of several layers of different materials is said to be "transparent" when the layer or layers permit at least 50% of the ambient electromagnetic radiation in relevant wavelengths to be transmitted through the layer or layers. Similarly, layers which permit some but less than 50% transmission of ambient electromagnetic radiation in relevant wavelengths are said to be "semi-transparent."

Currently, the most common transparent electrodes are transparent conducting oxides (TCOs), specifically indium-tin-oxide (ITO) on glass. However, ITO can be an inadequate solution for many of the above-mentioned applications (e.g., due to its relatively brittle nature, correspondingly inferior flexibility and abrasion resistance), and the indium component of ITO is rapidly becoming a scarce commodity. Additionally, ITO deposition usually requires expensive, high-temperature sputtering, which can be incompatible with many device process flows. Hence, more robust, abundant and easily-deposited transparent conductor materials are being explored.

SUMMARY OF THE INVENTION

The present invention describes nanostructure films. Nanostructures have attracted a great deal of recent attention due to their exceptional material properties. Nanostructures may include, but are not limited to, nanotubes (e.g., single-walled carbon nanotubes (SWNTs), multi-walled carbon nanotubes (MWNTs), double-walled carbon nanotubes (DWNTs), few-walled carbon nanotubes (FWNTs), other fullerenes (e.g., buckyballs), graphene flakes/sheets, and/or nanowires (e.g., metallic (e.g., Ag, Ni, Pt, Au), semiconducting (e.g., InP, Si, GaN), dielectric (e.g., $SiO_2$, $TiO_2$), organic, inorganic). Nanostructure films may comprise at least one interpenetrating network of such nanostructures, and may similarly exhibit exceptional material properties. For example, nanostructure films comprising at least one interconnected network of carbon nanotubes (e.g., wherein nanostructure density is above a percolation threshold) can exhibit extraordinary strength and electrical conductivity, as well as efficient heat conduction and substantial optical transparency.

In one embodiment, a coated substrate may comprise a nanostructure film coated on a non-planar substrate. The substrate may be non-planar (e.g., curved, convex, concave, tubular, bent around a corner and/or edge) in a relaxed state and/or compliant, and/or may comprise a polymer (e.g., one wherein bonds begin to break at temperatures over about 150 C). The coated substrate, and/or the nanostructure film portion thereof, may be optically transparent and electrically conductive, may be bent more than 20 degrees without losses in structural, electrical and/or optical functionality, and/or may comprise an interconnected network of carbon nanotubes.

A method of fabricating a coated substrate as described above may comprise forming a nanostructure film on a non-planar substrate. The nanostructure film may be coated by, for example, depositing a nanostructure dispersion on the substrate and/or transferring a film to the substrate from a donor substrate, release liner, laminate and/or transfer stamp.

In accordance with one embodiment of the present invention, a method for fabricating a transparent conductor comprising a uniform film of primarily single walled carbon nanotubes (SWNT) is provided.

The method involves first depositing a solution of SWNTs in a solvent (with or without a surfactant) on a substrate. The solution may be squeezed to a uniform thickness with a Meyer rod, or may simply be allowed to wet the substrate through a dip-coating technique.

The solvent is subsequently flash-dried from the solution in a uniform manner. In one embodiment, such flash-drying begins on one side of the substrate, and sweeps across the substrate in a "drying wave." Heat can be applied in various manners, for example by linear heating bar or infrared laser. Additionally, solvent evaporation may be aided by air-flow blow drying, and the substrate may undergo subsequent water rinsing to remove surfactant.

To achieve a coat of a desired thickness, this process can be repeated multiple times. Factors that determine the number of cycles required for a certain film thickness include the concentration of nanostructures in the solution and the thickness of each nanostructure solution layer after a Meyer rod sweep.

Other features and advantages of the invention will be apparent from the accompanying drawings and from the detailed description. One or more of the above-disclosed embodiments, in addition to certain alternatives, are provided in further detail below with reference to the attached figures. The invention is not limited to any particular embodiment disclosed; the present invention may be employed in not only transparent conductive film applications, but in other nanostructure applications as well (e.g., nontransparent electrodes, transistors, diodes, conductive composites, electrostatic shielding, etc.).

BRIEF DESCRIPTION OF THE DRAWINGS

The invention is better understood from reading the following detailed description of the preferred embodiments, with reference to the accompanying figures in which.

Features, elements, and aspects of the invention that are referenced by the same numerals in different figures represent the same, equivalent, or similar features, elements, or aspects in accordance with one or more embodiments of the system.

DETAILED DESCRIPTION OF THE EMBODIMENTS

Figure 1:
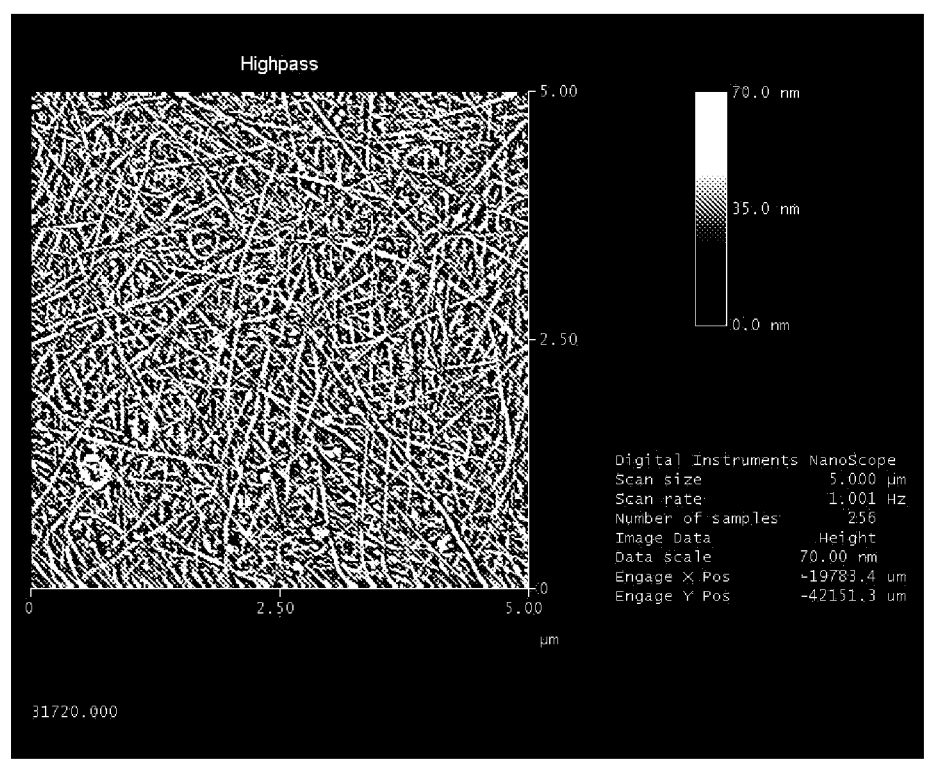
FIG. 1 is a scanning electron microscope (SEM) image of a nanostructure film according to one embodiment of the present invention.

Referring to FIG. 1, a nanostructure film according to one embodiment of the present invention comprises at least one interconnected network of single-walled carbon nanotubes (SWNTs). Such film may additionally or alternatively comprise other nanotubes (e.g., MWNTs, DWNTs), other fullerenes (e.g., buckyballs), graphene flakes/sheets, and/or nanowires (e.g., metallic (e.g., Ag, Ni, Pt, Au), semiconducting (e.g., InP, Si, GaN), dielectric (e.g., $SiO_2$, $TiO_2$), organic, inorganic).

Such a nanostructure film may further comprise at least one functionalization material bonded to the nanostructure film. For example, a dopant bonded to the nanostructure film may increases the electrical conductivity of the film by increasing carrier concentration. Such dopant may comprise at least one of Iodine ($I_2$), Bromine ($Br_2$), polymer-supported Bromine ($Br_2$), Antimonypentafluride ($SbF_5$), Phosphoruspentachloride ($PCl_5$), Vanadiumoxytrifluride ($VOF_3$), Silver(II)Fluoride ($AgF_2$), 2,1,3-Benzoxadiazole-5-carboxylic acid, 2-(4-Biphenylyl)-5-phenyl-1,3,4-oxadiazole, 2,5-Bis-(4-aminophenyl)-1,3,4-oxadiazole, 2-(4-Bromophenyl)-5-phenyl-1,3,4-oxadiazole, 4-Chloro-7-chlorosulfonyl-2,1,3-benzoxadiazole, 2,5-Diphenyl-1,3,4-oxadiazole, 5-(4-Methoxyphenyl)-1,3,4-oxadiazole-2-thiol, 5-(4-Methylphenyl)-1,3,4-oxadiazole-2-thiol, 5-Phenyl-1,3,4-oxadiazole-2-thiol, 5-(4-Pyridyl)-1,3,4-oxadiazole-2-thiol, Methyl viologen dichloride hydrate, Fullerene-C60, N-Methylfulleropyrrolidine, N,N'-Bis(3-methylphenyl)-N,N'-diphenylbenzidine, Triethylamine (TEA), Triethanolanime (TEA)-OH, Trioctylamine, Triphenylphosphine, Trioctylphosphine, Triethylphosphine, Trinapthylphosphine, Tetradimethylaminoethene, Tris(diethylamino)phosphine, Pentacene, Tetracene, N,N'-Di-[(1-aphthyl)-N,N-diphenyl]-1,1'-biphenyl)-4,4'-diamine sublimed grade, 4-(Diphenylamino) benzaldehyde, Di-p-tolylamine, 3-Methyldiphenylamine, Triphenylamine, Tris[4-(diethylamino)phenyl]amine, Tri-p-tolylamine, Acradine Orange base, 3,8-Diamino-6-phenylphenanthridine, 4-(Diphenylamino)benzaldehyde diphenylhydrazone, Poly(9-vinylcarbazole), Poly(1-vinylnaphthalene), Triphenylphosphine, 4-Carboxybutyl) triphenylphosphonium bromide, Tetrabutylammonium benzoate, Tetrabutylammonium hydroxide 30-hydrate, Tetrabutylammonium triiodide, Tetrabutylammonium bis-trifluoromethanesulfonimidate, Tetraethylammonium trifluoromethanesulfonate, Oleum ($H_2SO_4$—$SO_3$), Triflic acid and/or Magic Acid.

Such a dopant may be bonded covalently or noncovalently to the film. Moreover, the dopant may be bonded directly to the film or indirectly through and/or in conjunction with another molecule, such as a stabilizer that reduces desorption of dopant from the film. The stabilizer may be a relatively weak reducer (electron donor) or oxidizer (electron acceptor), where the dopant is a relatively strong reducer (electron donor) or oxidizer (electron acceptor) (i.e., the dopant has a greater doping potential than the stabilizer). Additionally or alternatively, the stabilizer and dopant may comprise a Lewis base and Lewis acid, respectively, or a Lewis acid and Lewis base, respectively. Exemplary stabilizers include, but are not limited to, aromatic amines, other aromatic compounds, other amines, imines, trizenes, boranes, other boron-containing compounds and polymers of the preceding compounds. Specifically, poly(4-vinylpyridine) and/or tri-phenyl amine have displayed substantial stabilizing behavior in accelerated atmospheric testing (e.g., 1000 hours at 65° C. and 90% relative humidity).

Stabilization of a dopant bonded to a nanostructure film may also or alternatively be enhanced through use of an encapsulant. The stability of a non-functionalized or otherwise functionalized nanostructure film may also be enhanced through use of an encapsulant. Accordingly, yet another embodiment of the present invention comprises a nanostructure film coated with at least one encapsulation layer. This encapsulation layer preferably provides increased stability and environmental (e.g., heat, humidity and/or atmospheric gases) resistance. Multiple encapsulation layers (e.g., having different compositions) may be advantageous in tailoring encapsulant properties. Exemplary encapsulants comprise at least one of a fluoropolymer, acrylic, silane, polyimide and/or polyester encapsulant (e.g., PVDF (Hylar CN, Solvay), Teflon AF, Polyvinyl fluoride (PVF), Polychlorotrifluoroethylene (PCTFE), Polyvinylalk:yl vinyl ether, Fluoropolymer dispersion from Dupont (TE 7224), Melamine/Acrylic blends, conformal acrylic coating dispersion, etc.). Encapsulants may additionally or alternatively comprise UV and/or heat cross-linkable polymers (e.g., Poly(4-vinyl-phenol)).

A nanostructure film according to one embodiment may also comprise application-specific additives. For example, thin nanotube films can be inherently transparent to infrared radiation, thus it may be advantageous to add an infrared (IR) absorber thereto to change this material property (e.g., for window shielding applications). Exemplary IR absorbers include, but are not limited to, at least one of a cyanine, quinone, metal complex, and photochronic. Similarly, UV absorbers may be employed to limit the nanostructure film's level of direct UV exposure.

A nanostructure film according to one embodiment may be fabricated using solution-based processes. In such processes, nanostructures may be initially dispersed in a solution with a solvent and dispersion agent. Exemplary solvents include, but are not limited to, deionized (DI) water, alcohols and/or benzo-solvents (e.g., tolulene, xylene). Exemplary dispersion agents include, but are not limited to, surfactants (e.g., sodium dodecyl sulfate (SDS), Triton X, NaDDBS) and biopolymers (e.g., carboxymethylcellulose (CMC)). Dispersion may be further aided by mechanical agitation, such as by cavitation (e.g., using probe and/or bath sonicators), shear (e.g., using a high-shear mixer and/or roto-stator), resonance and/or homogenization (e.g., using a homogenizer). Coating aids may also be employed in the solution to attain desired coating parameters, e.g., wetting and adhesion to a given substrate; additionally or alternatively, coating aids may be applied to the substrate. Exemplary coating aids include, but are not limited to, aerosol OT, fluorinated surfactants (e.g., Zonyl FS300, FS500, FS62A), alcohols (e.g., hexanol, heptanol, octanol, nonanol, decanol, undecanol, dodecanol, saponin, ethanol, propanol, butanol and/or pentanol), aliphatic amines (e.g., primary, secondary (e.g., dodecylamine), tertiary (e.g., triethanolamine), quartinary), TX-100, FT248, Tergitol TMN-10, Olin 10G and/or APG325.

The resulting dispersion may be coated onto a substrate using a variety of coating methods. Coating may entail a single or multiple passes, depending on the dispersion properties, substrate properties and/or desired nanostructure film properties. Exemplary coating methods include, but are not limited to, spray-coating, dip-coating, drop-coating and/or casting, roll-coating, transfer-stamping, slot-die coating, curtain coating, [micro]gravure printing, flexoprinting and/or inkjet printing. Exemplary substrates may be flexible or rigid, and include, but are not limited to, glass, elastomers (e.g., saturated rubbers, unsaturated rubbers, thermoplastic elastomers (TPE), thermoplastic vulcanizates (TPV), polyurethane rubber, polysulfide rubber, resilin and/or elastin) and/or plastics (e.g., polymethyl methacrylate (PMMA), polyolefin, polyethylene terephthalate (PET), polyethylene naphthalate (PEN), polycarbonate (PC) and/or polyethersulfone (PES)). Flexible substrates may be advantageous in having compatibility with roll-to-roll (a.k.a. reel-to-reel) processing, wherein one roll supports uncoated substrate while another roll supports coated substrate. As compared to a batch process, which handles only one component at a time, a roll-to-roll process represents a dramatic deviation from current manufacturing practices, and can reduce capital equipment and product costs, while significantly increasing throughput.

Once coated onto a substrate, the dispersion may be heated to remove solvent therefrom, such that a nanostructure film is formed on the substrate. Exemplary heating devices include a hot plate, heating rod, heating coil and/or oven. The resulting film may be subsequently washed (e.g., with water, ethanol and/or IPA) and/or oxidized (e.g., baked and/or rinsed with an oxidizer such as nitric acid, sulfuric acid and/or hydrochloric acid) to remove residual dispersion agent and/or coating aid therefrom.

Dopant, other additives and/or encapsulant may further be added to the film. Such materials may be applied to the nanostructures in the film before, during and/or after film formation, and may, depending on the specific material, be applied in gas, solid and/or liquid phase (e.g., gas phase $NO_2$ or liquid phase nitric acid ($HNO_3$) dopants). Such materials may moreover be applied through controlled techniques, such as the coating techniques enumerated above in the case of liquid phase materials (e.g., slot-die coating a polymer encapsulant).

A nanostructure film according to one embodiment may be patterned before (e.g., using lift-off methods, pattern-pretreated substrate), during (e.g., patterned transfer printing, inkjet printing) and/or after (e.g., using laser ablation or masking/etching techniques) fabrication on a substrate.

In one exemplary embodiment, an optically transparent and electrically conductive nanostructure film comprising an interconnected network of SWNTs was fabricated on a transparent and flexible plastic substrate via a multi-step spray and wash process. A SWNT dispersion was initially formulated by dissolving commercially available SWNT powder (e.g., P3 from Carbon Solutions) in DI water with 1% SDS, and probe sonicated for 30 minutes at 300 W power. The resulting dispersion was then centrifuged at 10k ref (relative centrifugal field) for 1 hour, to remove large agglomerations of SWNTs and impurities (e.g., amorphous carbon and/or residual catalyst particles). In parallel, a PC substrate was immersed in a silane solution (a coating aid comprising 1% weight of 3-aminopropyltriethoxysilane in DI water) for approximately five minutes, followed by rinsing with DI water and blow drying with nitrogen. The resulting pretreated PC substrate (Tekra 0.03" thick with hard coating) was then spray-coated over a 100° C. hot plate with the previously-prepared SWNT dispersion, immersed in DI water for 1 minute, then sprayed again, and immersed in DI water again. This process of spraying and immersing in water may be repeated multiple times until a desired sheet resistance (e.g., film thickness) is achieved.

In a related exemplary embodiment, a doped nanostructure film comprising an interconnected network of SWNTs was fabricated on a transparent and flexible substrate using the dispersion and deposition methods described above, except with a SWNT dispersion additionally containing a $TCNQF_4$ dopant. In yet another related embodiment, this doped nanostructure film was subsequently encapsulated by spin-coating a layer of parylene thereon and baking.

In another exemplary embodiment, a SWNT dispersion was first prepared by dissolving SWNT powder (e.g., P3 from Carbon Solutions) in DI water with 1% SDS and bath-sonicated for 16 hours at 100 W, then centrifuged at 15000 ref for 30 minutes such that only the top ¾ portion of the centrifuged dispersion is selected for further processing. The resulting dispersion was then vacuum filtered through an alumina filter with a pore size of 0.1-0.2 µm (Watman Inc.), such that an optically transparent and electrically conductive SWNT film forms on the filter. DI water was subsequently vacuum filtered through the film for several minutes to remove SDS. The resulting film was then transferred to a PET substrate by a PDMS (poly-dimethylsiloxane) based transfer printing technique, wherein a patterned PDMS transfer stamp is first placed in conformal contact with the film on the filter such that a patterned film is transferred from the filter to the stamp, and then placed in conformal contact with the PET substrate and heated to 80° C. such that the patterned film is transferred to the PET.

Figure 2:
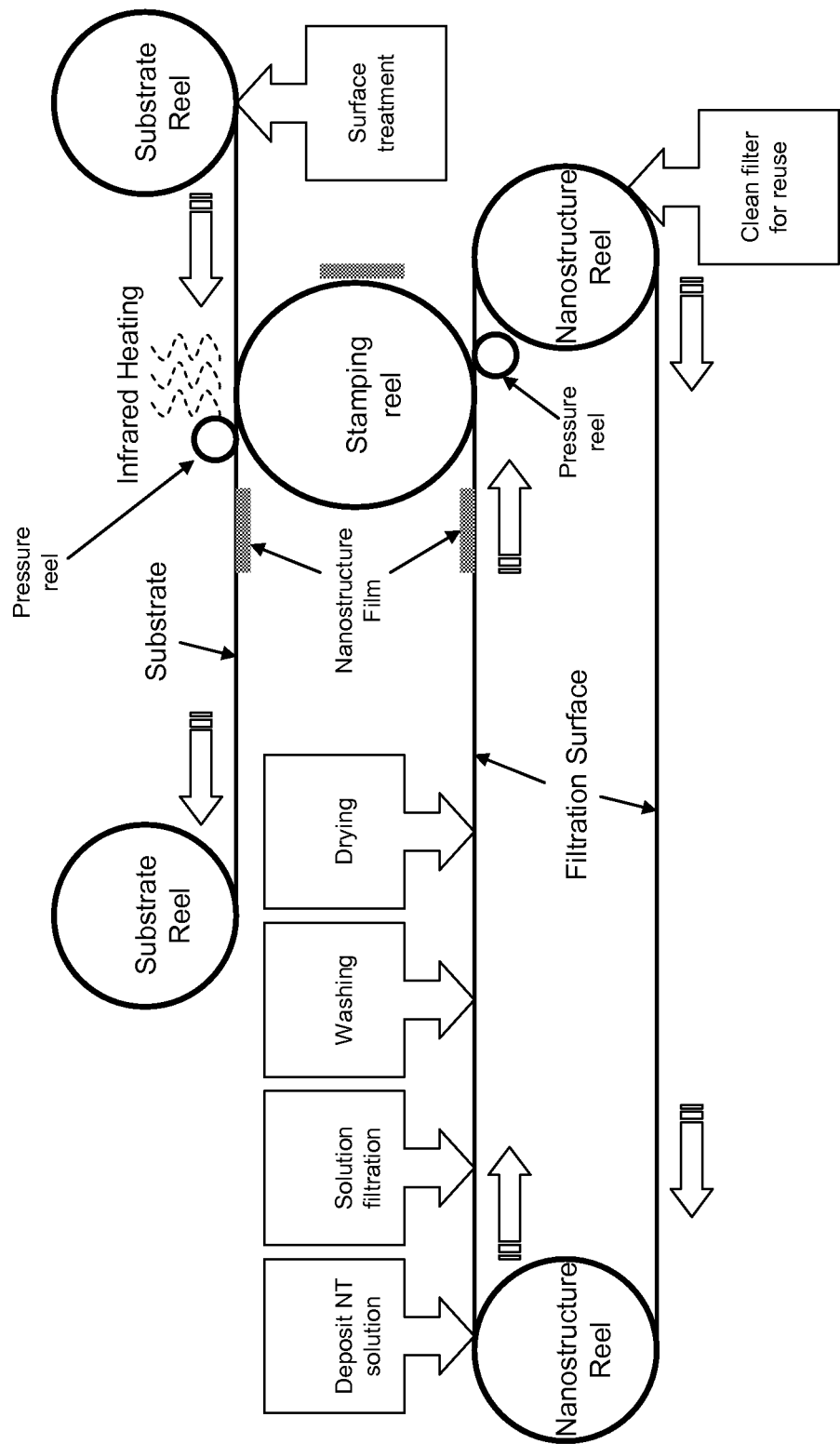
FIG. 2 is a schematic representation of a deposition method according to one embodiment of the present invention.

In a related exemplary embodiment, this patterned film was subsequently doped via immersion in a gaseous $NO_2$ chamber, which decreased the film's sheet resistance by about a factor of three. In another related exemplary embodiment, the film may be encapsulated by a layer of PMPV by dip coating, which, in the case of a doped film, can substantially reduce desorption of dopant from the film (i.e., dopant stability). In yet another related embodiment, referring to FIG. 2, at least one of the filter, transfer stamp and substrate may be operated on a reel-to-reel apparatus, e.g., as described in U.S. Provisional Application No. 60/865,826, filed Nov. 14, 2006 and entitled "TRANSFER STAMPING OF NANOSTRUCTURE FILMS," which is incorporated herein by reference.

In another exemplary embodiment, an optically transparent, electrically conductive, doped and encapsulated nanostructure film comprising an interconnected network of FWNTs was fabricated on a transparent and flexible substrate. CVD-grown FWNTs (OE grade from Unidym, Inc.) were first dissolved in DI water with 0.5% Triton-X, and probe sonicated for one hour at 300 W power. The resulting dispersion was then slot-die coated onto a PET substrate, and baked at about 100° C. to evaporate the solvent. The Triton-X was subsequently removed from the resulting FWNT film by immersing the film for about 15-20 seconds in nitric acid (10 molar). Nitric acid may be effective as both an oxidizing agent for surfactant removal, and a doping agent as well, improving the sheet resistance of the film from 498 ohms/sq to about 131 ohms/sq at about 75% transparency, and 920 ohms/sq to about 230 ohms/sq at 80% transparency in exemplary films. In related exemplary embodiments, these films were subsequently coated with triphenylamine which stabilized the dopant (i.e., the film exhibited a less than 10% change in conductivity after 1000 hours under accelerated aging conditions (65° C.)). In other related exemplary embodiments, the films were then encapsulated with Teflon AF.

In another exemplary embodiment, FWNT powder was initially dispersed in water with SDS (e.g., 1%) surfactant by sonication (e.g., bath sonication for 30 minutes, followed by probe sonication for 30 minutes); 1-dodecanol (e.g., 0.4%) was subsequently added to the dispersion by sonication (e.g., probe sonication for 5 minutes) as a coating aid, and the resulting dispersion was Meyer rod coated onto a PEN substrate. SDS was then removed by rinsing the film with DI water, and the 1-dodecanol was removed by rinsing with ethanol. The resulting optically transparent and electrically conductive film passed an industry-standard "tape test," (i.e., the FWNT film remained on the substrate when a piece of Scotch tape was pressed onto and then peeled off of the film); such adhesion between the FWNT film and PEN was not achieved with SDS dispersions absent use of a coating aid.

Figure 3A:
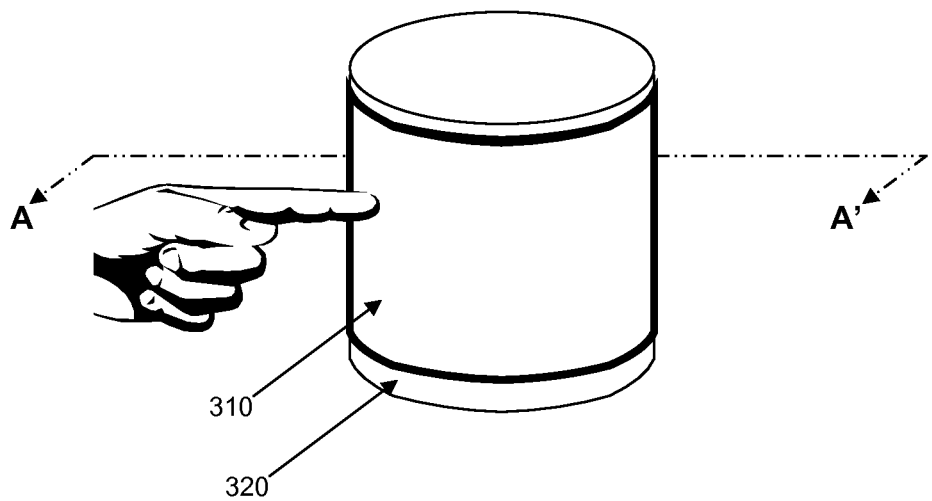
FIGS. 3A, 3B and 3C are schematic representations of coated substrates according to embodiments of the present invention.
Figure 3B:
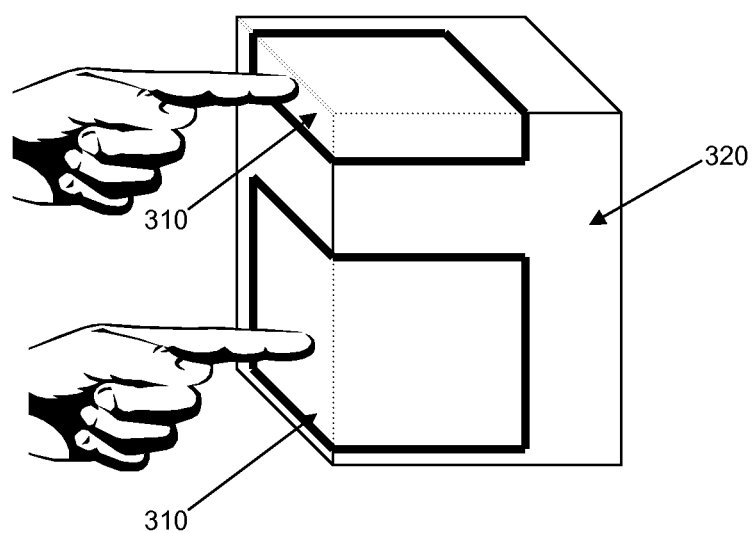
Figure 3C:
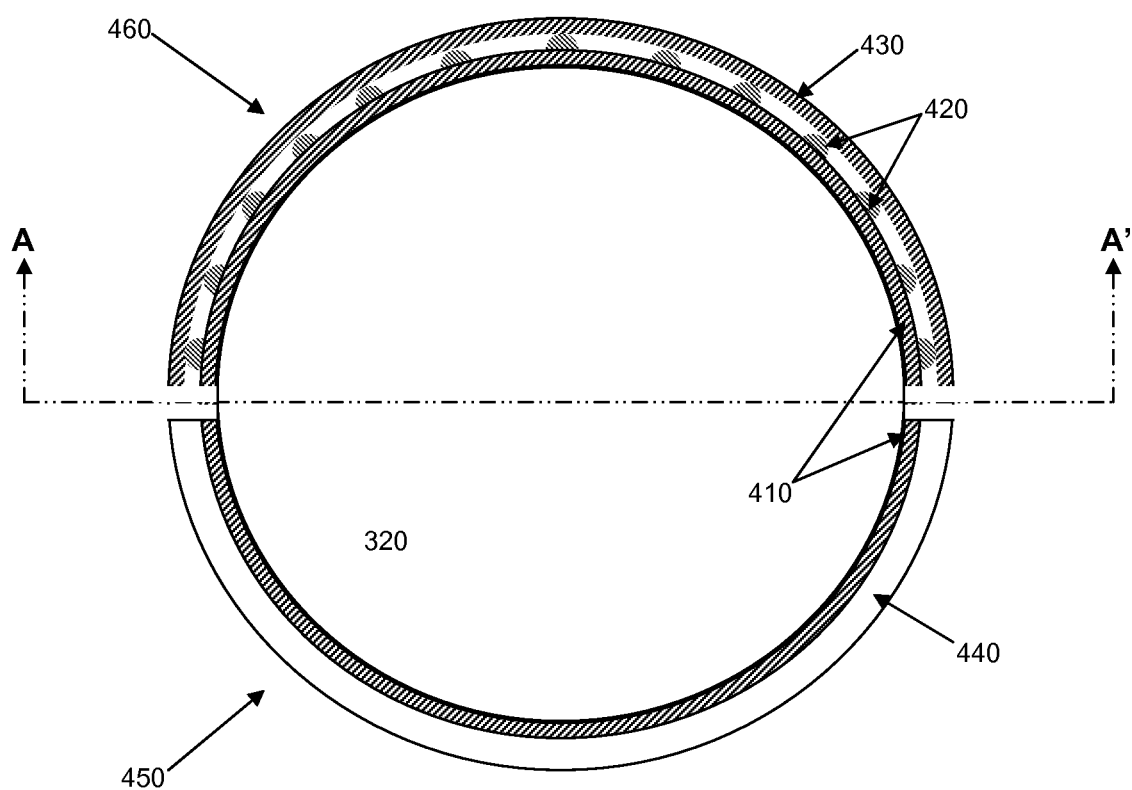

Referring to FIG. 3, a nanostructure film 310 according to one embodiment may be formed on a non-planar substrate 320. The film may be optically transparent and electrically conductive. The substrate 320 may be non-planar (e.g., curved, convex, concave, tubular, bent around a corner and/or edge) even in a relaxed state (e.g., the curved surface of a tube), and/or may be non-planar during the nanostructure film fabrication process; alternatively, the substrate may be relatively planar during the nanostructure film fabrication process, and subsequently made relatively non-planar (e.g., vacuum molded thermoplastics). The substrate may further be compliant (e.g., the surface of a PET container), given that a nanostructure film 310 formed on a non-planar and compliant substrate may be substantially deformed without permanent damage to the film (e.g., as compared with ITO, which at commonly-employed thicknesses will undergo plastic deformation and/or cracking when bent more than 20 degrees, and will consequently suffer losses in structural, electrical and/or optical functionality).

In one exemplary embodiment, a nanostructure film may be formed on a non-planar and/or compliant substrate using a flash dry deposition technique. Because of its relatively low process temperature, this technique is compatible with a variety of substrates (e.g., PET, bonds in which begin to break at temperatures (~120 C)) significantly lower than those required for vacuum-coating ITO (~150 C or more)).

In another exemplary embodiment, a nanostructure film may be formed on a non-planar and/or compliant substrate by transferring a nanostructure film from a donor substrate, laminate, release liner and/or transfer stamp (e.g., PDMS). The donor substrate, laminate, release liner and/or transfer stamp may itself be non-planar and/or compliant, and may be placed in conformal contact with the substrate during film transfer. Film transfer may be induced by, for example, the application of heat and/or chemical treatment. The substrate may be coated with an adhesive layer to aid film transfer thereto.

Figure 4:
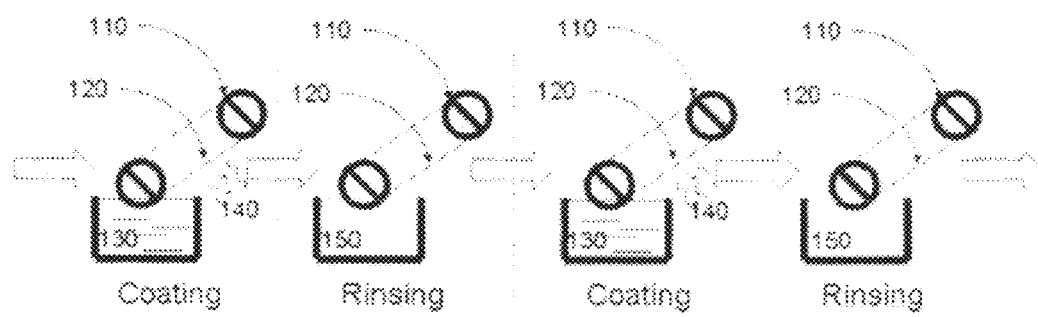
FIG. 4 is a schematic representation of a nanostructure film deposition method according to the present invention.

Referring to FIG. 4, in a preferred embodiment a deposition method according to the present invention comprises two basic steps: coating a substrate with a nanostructure-film solution and flash-drying the liquid solvent out of the nanostructure-film solution.

In the coating step, a substrate 120 may be wrapped around a set of rollers 110, and thereby dipped into a solution comprising nanostructures 130. The solution may be, for example, primarily single walled carbon nanotubes (SWNTs) dissolved in water, with or without surfactants (e.g., Triton-X, SDS, and DDBS). Alternatively, the carbon nanotubes may be dispersed in a polar or nonpolar organic solvent such as DMF or Chloroform.

Controlled rotation of the rollers 110 enables relatively uniform coating of the nanostructure solution 130 onto a surface of the substrate 120. The substrate is preferably transparent (e.g., PET, PEN, polycarbonate, or glass) and may require a pretreatment (e.g., with plasma or piranha to give the substrate surface hydrophilic properties) depending on the surfactant used.

Once the nanostructure solution is coated onto the substrate, the substrate passes over a local heating source 140, e.g., a hot plate or infrared heating region, to flash-dry the nanostructure solution. Flash-drying refers to a drying process wherein a heat source passes over a solution-coated substrate such that it induces a "drying wave" that sweeps across the surface of the substrate through the nanostructure solution. This "drying wave" is preferably linear, and produces a relatively uniform nanostructure-film without agglomeration. The aforementioned heat source may be, for example, a linear heating bar or infrared laser, and in a preferred embodiment the roller speed is less than the speed of the drying-wave of the nanostructure solution on the substrate.

If a surfactant was used to disperse the nanostructures in the solution, the dried films may need to be rinsed (e.g., in water 150) and dried (e.g., by air-flow blow dry and/or heat) between deposition cycles. The same roll-to-roll system used for deposition can be used for rinsing, wherein the nanostructure solution is replaced by, for example, water.

These alternating deposition and rinsing process may be repeated until a desired film thickness is achieved.

Figure 5:
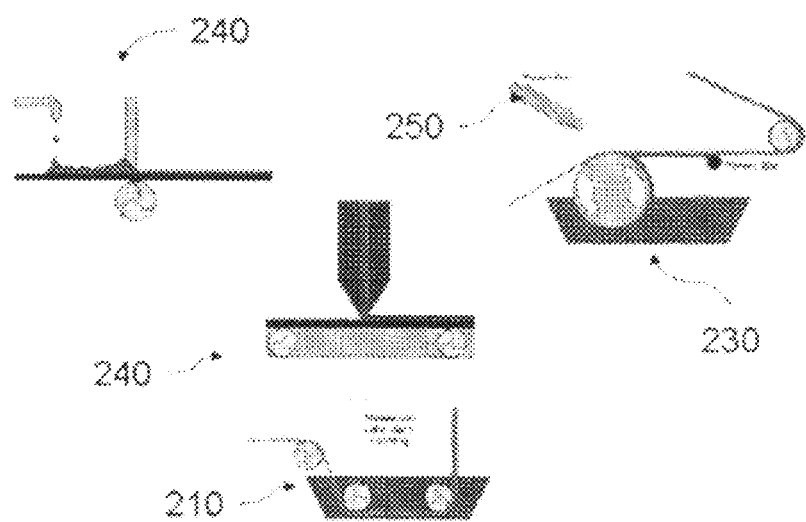
FIG. 5 illustrates various nanostructure solution deposition techniques.

Referring to FIG. 5, the nanostructure solution may be coated onto the substrate by such methods as dip coating 210, drop coating 220 or casting, roll coating 230 and/or inkjet printing 240. A Meyer rod 250 may be used to squeeze the solutions for a more uniform nanostructure solution coating.

Figure 6:
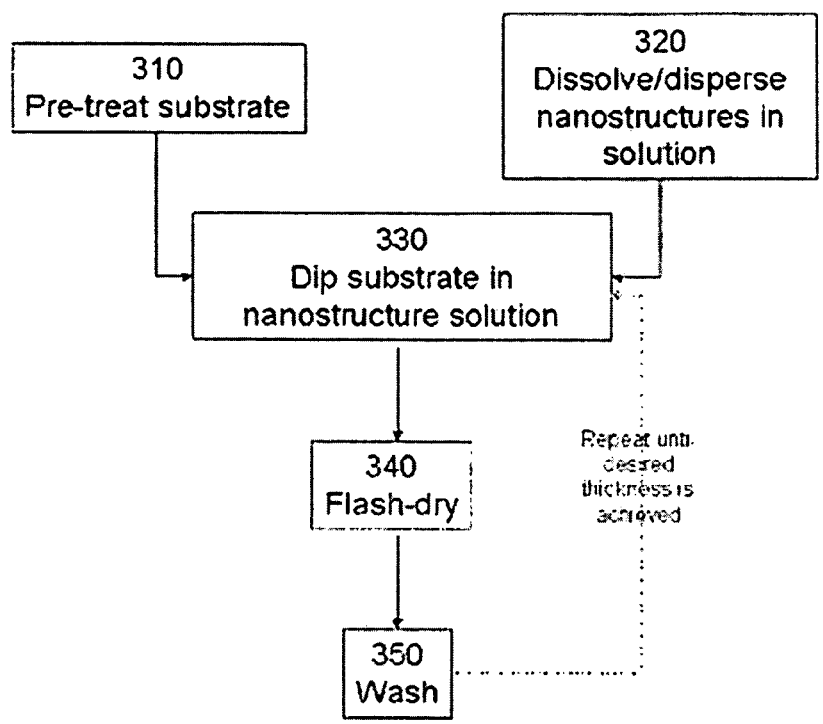
FIG. 6 is a flowchart showing a process for depositing a relatively uniform nanostructure-film according to an embodiment of the present invention.

Referring to FIG. 6, a preferred method begins with mixing a nanostructure solution 320 and pre-treating a substrate 310. The latter step may be omitted depending on the types of substrates and surfactants used. For example, transparent substrates such as PET, PEN, polycarbonate, or glass do not generally require pretreatment if Triton-X is used as a surfactant.

The substrate is then dipped into the nanostructure solution 330, the former having been either treated or matched with an appropriate surfactant such that a layer of solution coats the substrate surface.

Next, the solvent is evaporated from the solution in a uniform manner using a flash-drying method 340. In one embodiment, such evaporation begins on one side of the substrate, and sweeps across the substrate in a "drying wave." Heat can be applied in various manners, e.g., by linear heating bar or infrared laser. Additionally, solvent evaporation may be aided by air-flow blow drying.

If a surfactant is used, the substrate will preferably undergo a subsequent wash to remove surfactant from the dried nanostructure-film on the substrate. Washing may comprise rinsing the film with water, and then drying it with air-flow blow dry or heat.

Figure 7:
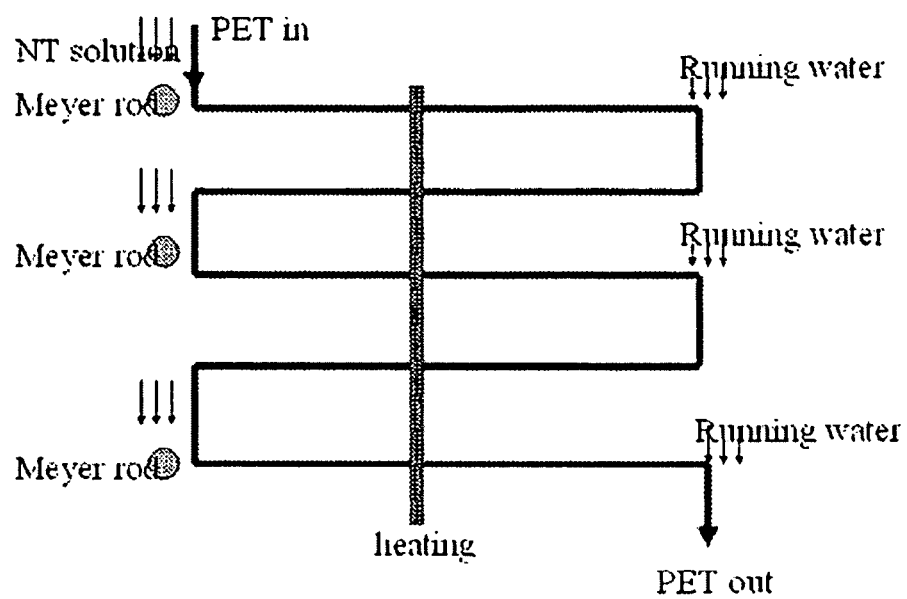
FIG. 7 shows a roll-to-roll apparatus consistent with a deposition method of the present invention.

Referring to FIG. 7, the flash-drying process is compatible with roll-to-roll fabrication processes for flexible substrates. One embodiment of such a fabrication process is shown, with a plurality of deposition cycles aimed at achieving a desired nanostructure-film thickness. The Meyer rods and wash cycles are generally optional, but may produce more uniform films and high-performance films depending on the substrate, surfactant, solvent, and nanostructures used.

The flash-drying process is applicable to rigid substrates as well, and can likewise be scaled-up. For example, a nanostructure solution may be coated onto a glass substrate by inkjet, and subsequently flash-dried to produce a relatively uniform nanostructure film.

The flash-drying process is further applicable to non-planar substrates. For example, a nanostructure solution may be coated on the inside of a glass tube and flash dried to produce a relatively uniform film. This film is preferably transparent and conductive, and may be used, for example, in electrowetting applications (e.g., manipulating fluid droplets through the tube). It should be noted that hollow objects other than glass tubes may be used (e.g., alternatively-shaped objects composed of other materials), as well as other deposition and drying methods.

Figure 8:
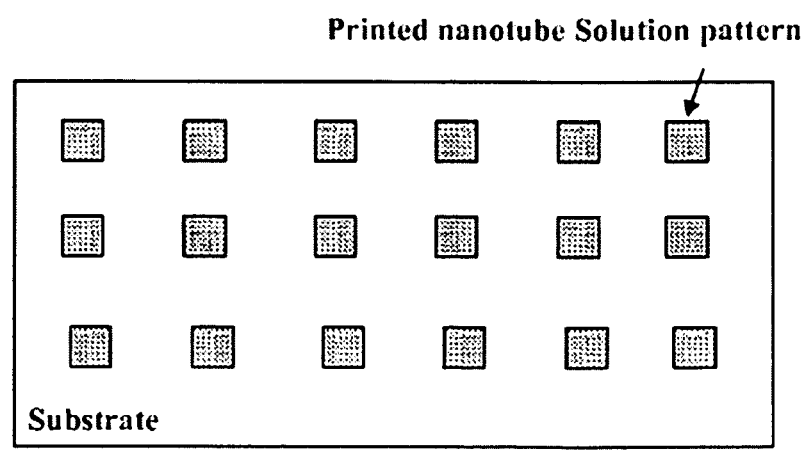
FIG. 8 is a schematic representation of a patterned nanostructure-film on a substrate, fabricated according to embodiments of the present invention.

FIG. 8 is a schematic representation of a patterned nanostructure-film on a substrate, fabricated according to embodiments of the present invention.

Referring to FIG. 8, the flash-drying process can also be used to fabricate patterned nanostructure-films, e.g., on a roll-to-roll basis.

In one embodiment, the substrate surface is pretreated (e.g., from hydrophobic to hydrophilic) and printed with a pattern of (e.g., hydrophilic) nanostructure solution. The solution is then flash-dried to produce a patterned and relatively uniform nanostructure-film.

In another embodiment, a hydrophilic solution without nanostructures is selectively printed on a hydrophobic substrate surface, for example, as disclosed by Fujihira et al (U.S. Pat. No. 6,868,786), and this patterned substrate is then dipped into a nanostructure solution. Nanostructures stick to the hydrophilic pattern on the substrate, but not the unpatterned portion of the hydrophobic substrate surface. Subsequent flash-drying again produces a patterned and relatively uniform nanostructure-film.

In yet another embodiment, photoresist is deposited and patterned using, for example, optical lithography. The substrate is then coated with a nanostructure solution and flash-dried to form a nanostructure film over the substrate surface and patterned photoresist layer. Subsequent lift-off of the photoresist reveals uncoated portions of the substrate, thereby producing a patterned nanostructure film. Note: lift-off patterns may be deposited and patterned using other methods (e.g., inkjet printers) and materials (e.g., toner).

Figure 9:
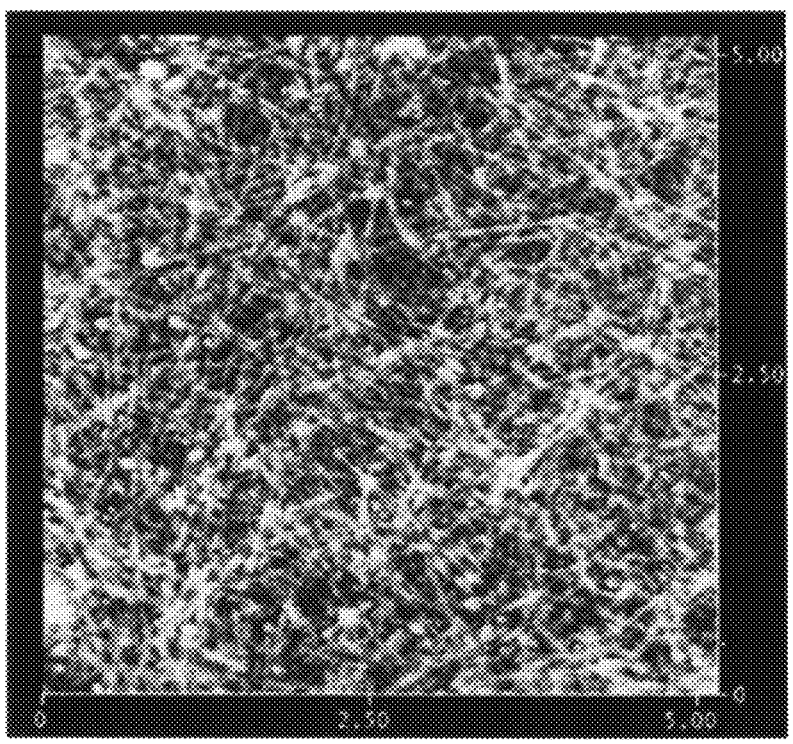
FIG. 9 is an AFM image showing the uniformity of a nanostructure-film deposited according to an embodiment of the present invention over a 5 µm range.

Referring to FIG. 9, the flash-drying method of the present invention has been used to produce relatively uniform nanostructure-films, for example a network of single walled carbon nanotubes (SWNTs) having bundle sizes of 4-6 nm. The deposition method of the present invention is also applicable to other nanostructures, including nanoparticles, nanowires, nanotubes and graphene flakes.

Nanostructure-films deposited according to an embodiment of the present invention have been shown to display DC conductivities in excess of 1600 S/cm on glass and on PET.

The present invention has been described above with reference to preferred features and embodiments. Those skilled in the art will recognize, however, that changes and modifications may be made in these preferred embodiments without departing from the scope of the present invention. These and various other adaptations and combinations of the embodiments disclosed are within the scope of the invention.

The present invention has been described above with reference to preferred features and embodiments. Those skilled in the art will recognize, however, that changes and modifications may be made in these preferred embodiments without departing from the scope of the present invention.

What is claimed is:

1. A method of fabricating a coated substrate, comprising:
   coating a substrate with a nanostructure solution;
   flash-drying the nanostructure solution to form a film with nanostructures on the substrate,
   washing the film with nanostructures on the substrate after the flash-drying the nanostructure solution; and
   repeating the coating the substrate with the nanostructure solution, the flash-drying the nanostructure solution, and the washing the film with nanostructures on the substrate until a first thickness for the film with nanostructures is achieved,
   wherein the substrate is planar during the film fabrication process and subsequently made non-planar, and
   the film includes at least one interconnected network of carbon nanotubes and is optically transparent and electrically conductive.

2. The method of claim 1, wherein the substrate is compliant.

3. The method of claim 1, wherein the coated substrate is optically transparent and electrically conductive.

4. The method of claim 3, wherein the coated substrate can be bent more than 20 degrees without losses in structural, electrical or optical functionality.

5. The method of claim 4, wherein the coating the substrate with the nanostructure solution includes depositing a nanostructure dispersion on the substrate.

6. The method of claim 4, wherein the film is transferred to the substrate from at least one of a donor substrate, a release liner, a laminate and a transfer stamp.

7. The method of claim 1, wherein the process further comprises squeezing the nanostructure solution to a uniform thickness prior to flash-drying.

8. The method of claim 1, wherein flash-drying is performed by sweeping a local heating source over the nanostructure solution coated on the substrate.

9. The method of claim 1, wherein flash-drying includes a linear drying wave in the nanostructure solution.

10. The method of claim 1, wherein the film formed with nanostructure is patterned.

11. The method of claim 1, wherein the film is coated on an inner surface of a hallow object.

12. The method of claim 1, wherein the substrate is supported by a roll-to-roll apparatus.

13. The method of claim 1, wherein, the film is formed by a process comprising:
    filtering a nanostructure dispersion to form the film with nanostructure on a filter; and
    transferring the film from the filter to the substrate.

14. The method of claim 13, wherein at least one of the filter and the substrate are supported by a roll-to-roll apparatus.

15. The method of claim 13, wherein the film is transferred by a stamping reel.

16. The method of claim 1, wherein the nanostructures include at least one of carbon nanotubes, fullerenes, nanowires, and inorganic nanostructures.

17. A method of fabricating a coated substrate, comprising:
coating a substrate with a nanostructure solution;
flash-drying the nanostructure solution to form a film with nanostructures on the substrate,
washing the film with nanostructures on the substrate after the flash-drying the nanostructure solution; and
repeating the coating the substrate with the nanostructure solution, the flash-drying the nanostructure solution, and the washing the film with nanostructures on the substrate until a first thickness for the film with nanostructures is achieved, wherein
the substrate is non-planar during the film fabrication process, and
the film is optically transparent and electrically conductive.

* * * * *